US008055578B1

(12) United States Patent
Hallman

(10) Patent No.: US 8,055,578 B1
(45) Date of Patent: Nov. 8, 2011

(54) GEOGRAPHIC INFORMATION SYSTEM FOR DEPICTING INFORMATION RELATING TO MORTGAGE LENDING ACTIVITY

(75) Inventor: Paul Hallman, Arlington, VA (US)

(73) Assignee: Fannie Mae, Washington, DC (US)

( * ) Notice: Subject to any disclaimer, the term of this patent is extended or adjusted under 35 U.S.C. 154(b) by 3355 days.

(21) Appl. No.: 10/324,099

(22) Filed: Dec. 20, 2002

Related U.S. Application Data

(60) Provisional application No. 60/342,858, filed on Dec. 28, 2001.

(51) Int. Cl.
*G06Q 40/00* (2006.01)
(52) U.S. Cl. .......... 705/38; 705/4; 705/10; 705/14; 705/14.39; 705/26.5; 705/26.8; 705/36 R; 701/207; 701/213; 707/104; 707/752; 709/219; 709/228; 715/835; 348/135; 348/143; 379/93.17; 702/150; 395/603
(58) Field of Classification Search .......... 701/207, 701/213; 705/4, 10, 14, 14.39, 26.5, 26.8, 705/36 R, 38; 707/752; 709/219, 228; 715/835; 1/1; 348/135, 143; 379/93.17; 702/150
See application file for complete search history.

(56) References Cited

U.S. PATENT DOCUMENTS

| | | | | | |
|---|---|---|---|---|---|
| 5,414,462 | A | * | 5/1995 | Veatch | 348/135 |
| 5,584,025 | A | * | 12/1996 | Keithley et al. | 707/752 |
| 5,611,052 | A | * | 3/1997 | Dykstra et al. | 705/38 |
| 5,689,650 | A | * | 11/1997 | McClelland et al. | 705/36 R |
| 5,729,731 | A | * | 3/1998 | Yajima et al. | 1/1 |
| 5,852,810 | A | * | 12/1998 | Sotiroff et al. | 705/26.8 |
| 5,930,776 | A | * | 7/1999 | Dykstra et al. | 705/38 |
| 5,978,769 | A | * | 11/1999 | Brown et al. | 705/4 |
| 6,038,522 | A | * | 3/2000 | Manson et al. | 702/150 |
| 6,101,496 | A | | 8/2000 | Esposito | |
| 6,128,663 | A | * | 10/2000 | Thomas | 709/228 |
| 6,240,425 | B1 | * | 5/2001 | Naughton | 707/104.1 |
| 6,282,362 | B1 | * | 8/2001 | Murphy et al. | 386/224 |
| 6,323,885 | B1 | * | 11/2001 | Wiese | 715/835 |
| 6,385,541 | B1 | * | 5/2002 | Blumberg et al. | 701/213 |
| 6,501,501 | B1 | * | 12/2002 | Miyazawa | 348/143 |
| 6,577,714 | B1 | * | 6/2003 | Darcie et al. | 379/93.17 |
| 6,578,011 | B1 | * | 6/2003 | Forward | 705/14.39 |
| 6,748,426 | B1 | * | 6/2004 | Shaffer et al. | 709/219 |
| 6,871,140 | B1 | * | 3/2005 | Florance et al. | 701/207 |
| 6,915,275 | B2 | * | 7/2005 | Banerjee et al. | 705/26.5 |
| 6,993,505 | B1 | * | 1/2006 | Katz et al. | 705/38 |
| 2002/0087389 | A1 | * | 7/2002 | Sklarz et al. | 705/10 |

OTHER PUBLICATIONS

ArcGIS 8.1: An ESRI White Paper • Jan. 2001 2000 Environmental Systems Research Institute, Inc., pp. i-iii, 1-29.
GIS by ESRI, "What is ArcGIS?" 2001, pp. i-iv, 1-43.
W. Fredrick Limp, "GEOWorld—Quick-Take Reviews," ArcGIS 8.1, Jul. 2001.

(Continued)

*Primary Examiner* — Mary Cheung
*Assistant Examiner* — Sanjeev Malhotra
(74) *Attorney, Agent, or Firm* — Rader, Fishman & Grauer PLLC

(57) ABSTRACT

A system for depicting information relating to mortgage lending activities. A database stores information including demographic, economic, and mortgage lending information used in mortgage lending activities. Information in the database and information entered by a user is used to depict customized geographic and demographic information relating to a mortgage activity.

15 Claims, 3 Drawing Sheets

OTHER PUBLICATIONS

ArcGIS 8.1: Overview—Dec. 26, 2001 http://www.esri.com/software/arcgis/overview.html.
ArcGIS 8.1: Key Features—Dec. 26, 2001 http://www.esri.com/software/arcgis/keyfeatures0.html.

MapInfo Professional: "The Leading Desktop Mapping Software for Business and GIS Analysts", www.mapinfo.com 2001.
MapInfo Professional User's Guide: Appendix J: MapInfo Data Interchange Format; pp. 674-693.

* cited by examiner

GEOGRAPHIC INFORMATION SYSTEM FOR DEPICTING INFORMATION RELATING TO MORTGAGE LENDING ACTIVITY

This application claims the benefit of U.S. Provisional Application No. 60/342,858, filed on Dec. 28, 2001 and incorporated by reference.

FIELD OF THE INVENTION

The present invention relates to a system and method for depicting geographic and demographic information relating to mortgage lending activities.

BACKGROUND OF THE INVENTION

Mortgage lending institutions often need to understand the markets in which they compete so that they can determine which segments of a market to target their products and/or services. Many mortgage lending institutions tend to focus on traditional markets and they do not generally respond to changing trends and/or demographics. These institutions also tend to forego hiring outside consultants due to costs and time constraints. As a result, there is an incomplete understanding of potential markets that leads to missed marketing opportunities for these institutions and may cause them to under serve potentially strategic markets.

Mapping tools have been developed to generate maps for the mortgage lending industry. These maps are based on specific geographic and demographic data. However, the information sources connected to current mapping tools are minimal. Moreover, these mapping tools do not provide filtering options that are needed to customize the data required by each mortgage lending institution to understand strategic markets. Without filtering the data that is presented to an institution, the institution is required to expend significant resources to seek out data that is necessary in making business decisions. While there are current marketing software that provide mapping and data mining capabilities, these software are not suited to the mortgage lending industry.

What is needed is a cost effective system and method that provide accurate, comprehensive and timely geographic and demographic lending results to lending mortgage institutions.

SUMMARY OF THE INVENTION

The present invention relates to a system for depicting geographic and demographic information relating to mortgage lending activities. The system includes a database, a mapping application, and a user interface. The database obtains geographic and demographic information used in mortgage lending activities from multiple public and private sources. The mapping application uses information in the database and information entered by a user to depict customized geographic and demographic information relating to mortgage activity. The mapping application uses the information entered by the user to filter the information retrieved from the database and to thereby customize the depicted information for use by a mortgage market participant in understanding a geographic area. The user interface includes means for enabling the user to transmit information to the mapping application and means for transmitting results from the mapping application to the user. The system also includes means for transmitting information from the user to the mapping application, for enabling the mapping application to use the information from the user to retrieve information from the database, and for returning results generated by the mapping component to the user.

The invention also relates to a method for depicting geographic and demographic information relating to mortgage lending activities by obtaining and storing mortgage lending related information in a database; accessing, by a user, the mortgage lending related information; identifying, by the user, options for filtering the mortgage lending related information; presenting the options to a mapping application; selecting, by the user, at least one geographic region and a thematic selection that is associated mortgage lending related information; matching, by the mapping application, a code for the at least one geographic region with mortgage lending related data in the database; generating, by the mapping application, a visual representation of the matched data, wherein the visual representation is customized according to the options identified by the user; and presenting the visual representation to the user.

Additional features and advantages of the invention will be set forth in the description that follows, and in part will be apparent from the description, or may be learned by practice of the invention. The objectives and advantages of the invention will be realized and attained by the system and method particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings.

DESCRIPTION OF THE PREFERRED EMBODIMENTS

Reference will now be made in detail to the preferred embodiments of the present invention, examples of which are illustrated in the accompanying drawings. The present invention described below extends the functionality of the inventive system and method for depicting geographic and demographic information relating to mortgage lending activity.

Figure 1:
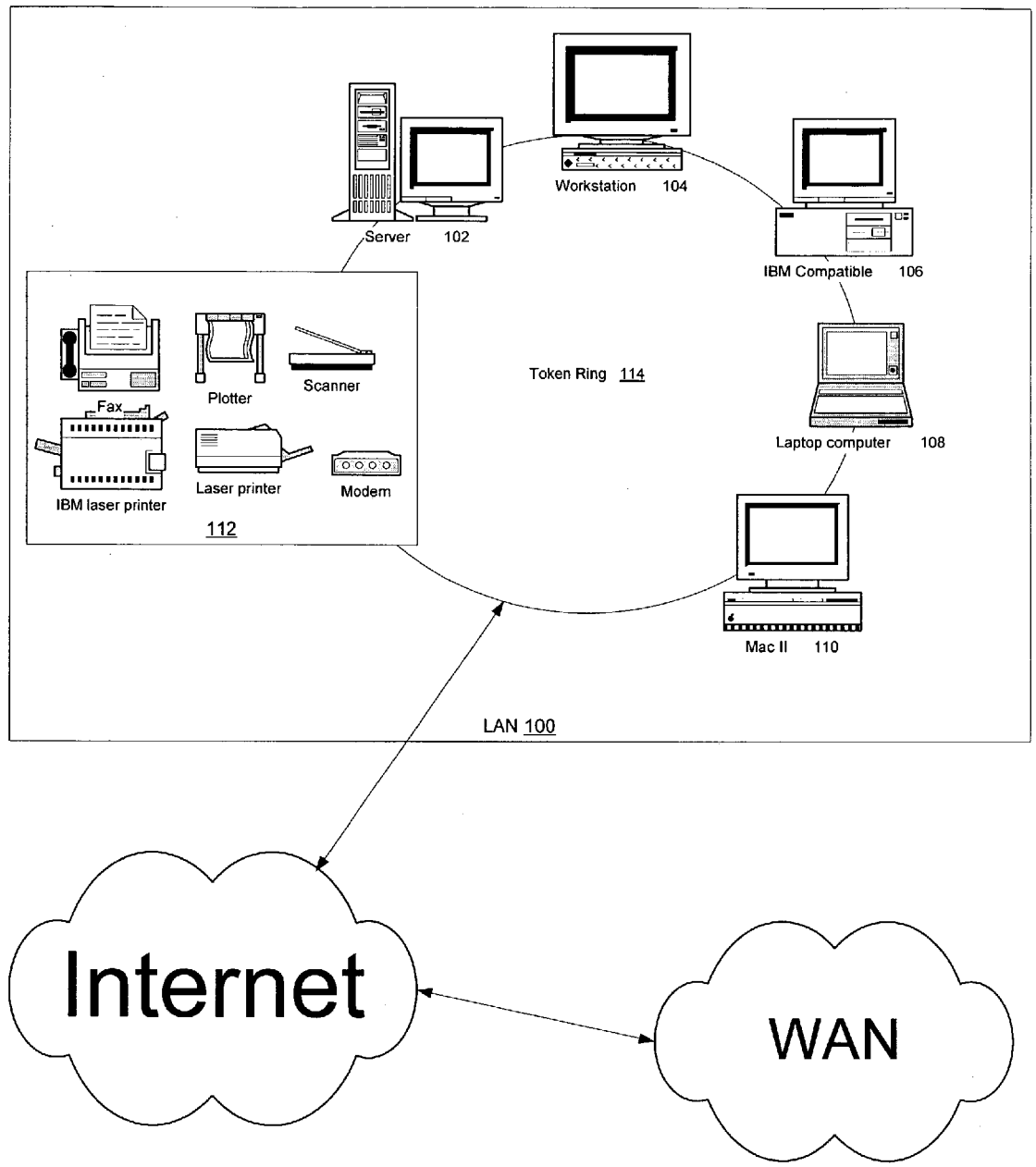
FIG. 1 illustrates a local area network (LAN) that is configured to generate geographic and demographic lending results.

FIG. 1 illustrates a local area network (LAN) 100 that is configured to present geographic and demographic information that is used in mortgage lending activities. LAN 100 comprises a server 102, four computer systems 104-110, and peripherals, such as printers and other devices 112, that may be shared by components on LAN 100. Computer systems 104-110 may serve as clients for server 102 and/or as clients and/or servers for each other and/or for other components connected to LAN 100. Components on LAN 100 are preferably connected together by cable media, for example copper or fiber-optic cable, and the network topology may be a token ring topology 114. It should be apparent to those of ordinary skill in the art that other media, for example wireless media, such as optical and radio frequency, may also connect LAN 100 components. It should also be apparent that other network topologies, such as Ethernet, may be used.

According to the invention, LAN 100 is connected to the Internet and may be connected to other LANs or Wide Area Networks (WAN). Hence some components of LAN 100 are preferably Web-enabled. The computer processor for executing the inventive system and method, for example server 102 and/or computer systems 104-110, include electronic storage media, such as disks, for storing programming code and data structures used to implement the inventive method and outputs therefrom. The invention uses a computer system, for example computer system 104, to implement an inventive application for depicting geographic and demographic information. Note that any computer system may be configured to implement the inventive method, and computer system 104 is only used for exemplary purposes.

Figure 2:
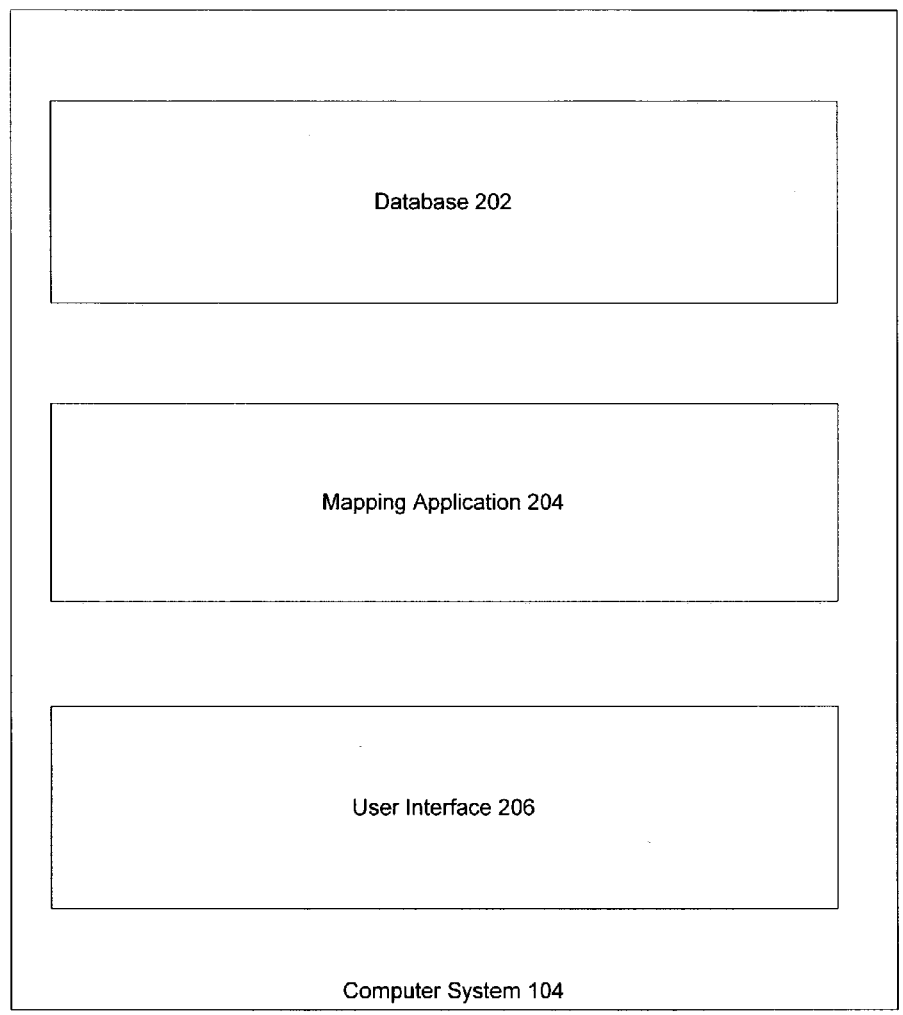
FIG. 2 illustrates components in the computer system 104 of the inventive system.

FIG. 2 illustrates components in computer system 104 that are used to depict geographic and demographic information relating to mortgage lending activities. Computer system 104 includes a database 202, a mapping application 204, and a user interface 206. Database 202 stores a wide range of information having characteristics that are useful to mortgage market participants. Mapping application 204 uses information entered into user interface 206 and information stored in database 202 to depict geographic and demographic information relating to mortgage lending activities. User interface 206 includes means for accessing mapping application 204 and information in database 202 and means for providing a visual representation of the information generated by mapping application 204. As is apparent to one skilled in the art, means for accessing from and entering into user interface 206 may include a web page, input/output devices in a desktop, laptop, PDA, or other electronic means for transmitting information a computing unit.

In a preferred embodiment of the invention, database 202 includes information, such as demographic information, economic information and mortgage lending information, relating to a geographic area. Database 202 also includes information that provides specific statistics about mortgaged properties and that may assist mortgage market participants in understanding strategic markets for a product and/or service. Database 202 obtains information from public and private sources, such as Census reports, private mortgage investments institutions and market research firms. In the inventive system, upon obtaining information from public and private sources, database 202 stores information relating to, among others, single and multi-family mortgage activities, mortgage market data, total number of loans outstanding in a geographic area, and statistical characteristics of a population in a geographic area. Database 202 also stores detailed information, such as the loans sold in the secondary mortgage market, loans to specific groups (for example, minority groups), and refinance loans in a geographic area.

In order to access information in database 202, a user enters a user identification and password for logging on the computer system 104, preferably through a web page. The user then accesses demographic, economic and mortgage lending information in database 202 by identifying a geographic area that is associated with the information. The user is allowed to select from a list of options on the web page that are used to filter the information stored on database 202 and to customize results generated by mapping application 204. Options on the web page include, among others, single family acquisitions, multi-family acquisitions, and total number of loans. The selections from the list of options by the user determines the type of information that is presented to the user by mapping application 204.

For example, if the user chooses to view mortgage market data, the user is preferably prompted to select from a number of options for defining how the results from the mortgage market data is be presented to the user. The user may be allowed to select options such as loans sold to the secondary market, loans sold a particular institution, loans to specific groups, for example minority groups, or the total number of sub-prime loans. If the user selects to obtain statistical characteristics of a population, the user is prompted to select statistical options, such as the median household income, median home value, homeownership rate, the percent of renter-occupied units, the percent of owner specified units, and the percent of a specific group.

After the user selects the options for customizing the results generated by mapping application, mapping application 204 preferably opens a set of options, which are a subset of the demographic, economic, and mortgage lending options selected by the user to retrieve specific information relating to a mortgage market. The user may then select from a number of geographic regions, such as county, central city, Metropolitan Statistical Area (MSA), congressional district, and a partnership office. The user may be prompted to make other selections that further clarify the geographic regions. The user is then prompted to make a thematic selection from thematic layers that show details at the census tract, block group, or county levels. This process of selecting options to customize the results from mapping application 204 enables the user to find a specific location for a loan product/service and/or branch. Moreover, by allowing the user to define the information that is included in the results from mapping application 204, the inventive system enables the user to narrow a wide range of statistical, demographic, economic and mortgage lending data into a customized representation of specific information for a particular geographic area.

After obtaining the selected options from the user, mapping application 204 accesses look up tables in database 202 and retrieves data for the specified geographic area. Geographic areas stored on database 202 are assigned codes; and demographic, economic, and mortgage lending data are assigned codes that are associated with the code for the geographic region to which they pertain. It should be apparent to one of ordinary skill in the art that other methods may be used to match demographic, economic, and mortgage lending data to the appropriate geographic regions. In a preferred embodiment, mapping application 204 matches the specific geographic code of a requested area with data assigned the same code. Thereafter, mapping application 204 retrieves the appropriate user-selected demographic, economic and mortgage lending data for the selected area. Mapping application 204 then generates a visual representation, preferable a map, of the processed information and presents the visual representation to user interface 206 for presentation to the user.

The user may select a time frame for information that is included in the visual representation. Time frame options in the inventive system may vary with the statistical information chosen by the user. In one embodiment, the user may be prompted by mapping application 204 to make a time frame selection that corresponds to the demographic, economic, and mortgage lending data selected by the user. The user may also optimize the layout of the visual representation after it has been generated. The user may then view the visual representation and adapt the representation to meet a specific business need.

In an alternate embodiment, the user may query an area in the visual representation to retrieve underlying information relating to the area. Upon querying a point in the visual representation for underlying data, mapping application 204 retrieves the underlying data from database 202.

Figure 3:
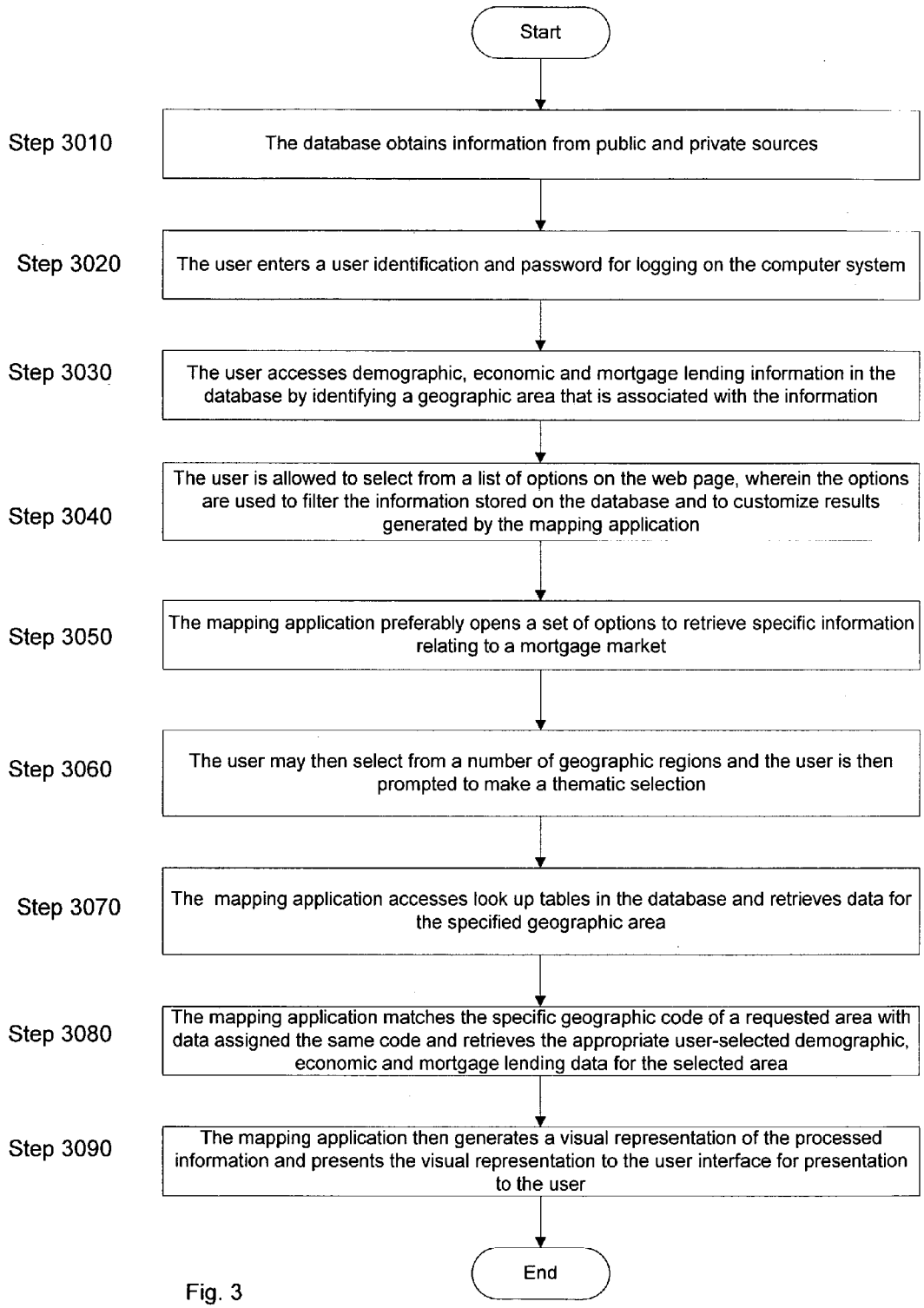
FIG. 3 illustrates the steps implemented in the inventive system.

FIG. 3 illustrates the steps implemented in the inventive system. In Step 3010, database 202 obtains information from public and private sources. In Step 3020, the user enters a user identification and password for logging on computer system 104. In Step 3030, the user accesses demographic, economic, and mortgage lending information in database 202 by identifying a geographic area that is associated with the information. In Step 3040, the user is allowed to select from a list of options on the web page, wherein the options are used to filter the information stored on database 202 and to customize results generated by mapping application 204. In Step 3050, mapping application 204 preferably opens a set of options to retrieve specific information relating to a mortgage market. In Step 3060, the user may then select from a number of geographic regions and the user is then prompted to make a thematic selection. In Step 3070 mapping application 204 accesses look up tables in database 202 and retrieves data for the specified geographic area. In Step 3080, mapping application 204 matches the specific geographic code of a requested area with data assigned the same code and retrieves the appropriate user-selected demographic, economic and mortgage lending data for the selected area. In Step 3090, mapping application then generates a visual representation of the processed information and presents the visual representation to user interface 206 for presentation to the user.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. A system for depicting geographic and demographic information relating to mortgage lending activities, the system comprising:
    a database that stores information including demographic, economic, and mortgage lending information used in mortgage lending activities from a plurality of public and private sources;
    a user interface, which is configured to receive from a user identifications of geographical regions, present to the user information in the database for identified geographical regions, receive from the user selections from a list of options that are used to filter the information from the database for the identified geographical regions, and present visual representations corresponding to the received information;
    a mapping application, in operative communication with the database and the user interface, which uses the information in the database and information entered by the user to generate the visual representations, wherein the visual representations include depictions of demographic, economic and mortgage lending information relating to a mortgage lending activity, wherein the mapping application receives the information received from the user from the list of options to filter the information retrieved from the database, and wherein the mapping application customizes the generated depictions of demographic, economic and mortgage lending information for selected geographic regions for use by a mortgage market participant in understanding mortgage lending activity for a geographic area that comprises the selected geographic regions.

2. The system of claim 1, wherein the information in the database provides statistics about mortgaged properties and is used to assist mortgage market participants in understanding strategic markets for a product.

3. The system of claim 1, wherein the public and private sources comprise census reports, mortgage investment institutions and market research firms.

4. The system of claim 1, wherein the user enters an identifier and password to access information on the database.

5. The system of claim 1, wherein the user interface is a web page.

6. The system of claim 1, wherein mapping application also prompts the user to select a geographic region and a thematic selection to retrieve specific information relating to a mortgage market in the selected geographic region.

7. The system of claim 1, wherein a mapping application accesses look up tables in the database to retrieve data for a specified geographic area.

8. The system of claim 1, wherein the geographic regions represented in the database are assigned codes that are used to associate the geographic regions with codes assigned to the demographic, economic, and mortgage lending information in the database, wherein based on the information entered by the user, the mapping application matches a specific geographic region code with data assigned the same code to retrieve the appropriate demographic, economic, and mortgage lending information from the database.

9. The system of claim 1, wherein the user is allowed to customize a visual representation that is generated by the mapping application through additional selections from the list of options.

10. A method for depicting geographic and demographic information relating to mortgage lending activities, the method comprising the steps of:
    obtaining and storing mortgage lending activity information in a database, said mortgage lending activity information comprising demographic, economic and mortgage lending information used in mortgage lending activities;
    receiving from a user identifications of geographical regions;
    presenting to the user mortgage lending activity information stored in the database that corresponds to the identified geographical regions;
    presenting to the user a list of options for filtering the mortgage lending activity information that corresponds to the identified geographical areas and receiving from the user selections from the list of options;
    generating of visual representations comprising receiving the selections from the list of options, filtering the mortgage lending activity information retrieved from the database, and customizing generated depictions of demographic, economic and mortgage lending information for the selected geographic regions; and
    presenting the visual representations to the user to convey an understanding of mortgage lending activity for a geographic area that comprises the selected geographic regions.

11. The method of claim 10, further comprising prompting the user to select a geographic region and a thematic selection to retrieve specific information relating to a mortgage market in the selected geographic region.

12. The method of claim 10, further comprising accessing look up tables in the database to retrieve data for a specified geographic area.

13. The method of claim 10, further comprising matching a specific geographic region code with data assigned the same code to retrieve the appropriate demographic, economic, and mortgage lending data from the database.

14. The method of claim 10, further comprising the step of allowing the user to customize the visual representation through additional selections from the list of options.

15. The method of claim 10, further comprising the step of allowing the user to query an area in a visual representation that is generated by the mapping application and wherein the mapping application retrieves underlying information relating to the area.

* * * * *